US008885600B2

(12) United States Patent  
Lee et al.

(10) Patent No.: US 8,885,600 B2
(45) Date of Patent: Nov. 11, 2014

(54) ENHANCED DELAY MANAGEMENT

(75) Inventors: Ki-Dong Lee, San Diego, CA (US); Li-Hsiang Sun, San Diego, CA (US)

(73) Assignee: LG Electronics Inc., Seoul (KR)

( * ) Notice: Subject to any disclaimer, the term of this patent is extended or adjusted under 35 U.S.C. 154(b) by 556 days.

(21) Appl. No.: 12/830,173

(22) Filed: Jul. 2, 2010

(65) Prior Publication Data

US 2011/0002304 A1 Jan. 6, 2011

Related U.S. Application Data

(60) Provisional application No. 61/222,899, filed on Jul. 2, 2009, provisional application No. 61/247,513, filed on Sep. 30, 2009.

(51) Int. Cl.
*H04W 36/00* (2009.01)
*H04W 36/02* (2009.01)
*H04W 84/04* (2009.01)
*H04W 92/20* (2009.01)
*H04B 7/26* (2006.01)

(52) U.S. Cl.
CPC ............ *H04W 36/02* (2013.01); *H04W 84/047* (2013.01); *H04W 92/20* (2013.01); *H04B 7/2606* (2013.01)
USPC ...................................................... 370/331

(58) Field of Classification Search
CPC .. H04B 7/2606; H04W 84/047; H04W 36/02; H04W 92/20
USPC .................................. 370/310, 328, 329, 331
See application file for complete search history.

(56) References Cited

U.S. PATENT DOCUMENTS

| 2005/0002407 A1 | 1/2005 | Shaheen et al. |
| 2005/0185653 A1 | 8/2005 | Ono et al. |
| 2008/0112365 A1 | 5/2008 | Kwun et al. |
| 2008/0227458 A1 | 9/2008 | Wu |

OTHER PUBLICATIONS

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.8.0, Mar. 2009, 157 pages.

*Primary Examiner* — Chi Pham
*Assistant Examiner* — Robert Lopata
(74) *Attorney, Agent, or Firm* — Lee, Hong, Degerman, Kang & Waimey

(57) ABSTRACT

A method to facilitate user equipment (UE) handoff within a packet data communication system includes determining, at a source relay node, that the UE is to undergo a handoff from the source relay node to a target entity and sending, by the source relay node, a first request to a network node serving the UE. The sending is performed responsive to the determination that the UE is to undergo the handoff, such that the first request is configured to cause the network gateway node to store packet data addressed to the UE. Further operations include sending, by the target entity, a second request to the network, such that the second request is configured to cause the network to forward the stored packet data to the target entity, and receiving, at the target entity from the network, the stored packet data for wirelessly transmitting to the UE.

14 Claims, 12 Drawing Sheets

ENHANCED DELAY MANAGEMENT

CROSS-REFERENCE TO RELATED APPLICATIONS

Pursuant to 35 U.S.C. §119(e), this application claims the benefit of Provisional Application No. 61/222,899, filed on Jul. 2, 2009, and Provisional Application No. 61/247,513, filed on Sep. 30, 2009, the contents of which are all incorporated by reference herein in their entirety.

FIELD OF THE INVENTION

Embodiments of the present invention relate to wireless communications, and, in particular, to managing the transfer of information and/or reducing a communication delay during handover of a mobile terminal.

DESCRIPTION OF THE RELATED ART

In a mobile communication system, a user equipment (UE) (e.g., a mobile terminal) is connected with a source base station (or a source relay node) to facilitate communication between them. During operation, a handover (or handoff) of the UE may be performed. For example, a handover procedure may be initiated due to a change in the location of the UE. During such a handover procedure, the UE becomes disconnected from the source base station, and a new connection between the UE and a target base station (or a target relay node) is established. The target base station corresponds to the new location of the UE (i.e., the location to which the UE has moved).

During handover, the source base station may transfer to the target base station data blocks that are addressed to the UE and that are stored at the source base station for delivery to the UE. Upon completion of handover, the target base station transmits to the UE such data blocks that were transferred from the source base station. During execution of the handover procedure, the mobile communication system strives to provide the UE with seamless (or near-seamless) services (e.g., from an external network), but there is often a delay involved with such an approach.

SUMMARY

In accordance with an embodiment, a method to facilitate user equipment (UE) handoff within a packet data communication system includes determining, at a source relay node, that the UE is to undergo a handoff from the source relay node to a target entity and sending, by the source relay node, a first request to a network serving the UE. The sending is performed responsive to the determination that the UE is to undergo the handoff, such that the first request is configured to cause the network to store packet data addressed to the UE. Further operations include sending, by the target entity, a second request to the network, such that the second request is configured to cause the network to forward the stored packet data to the target entity, and receiving, at the target entity from the network, the stored packet data for wirelessly transmitting to the UE.

In accordance with an embodiment, a method to facilitate UE handoff within a packet data communication system includes forwarding, by a network gateway serving the UE, packet data addressed to the UE to a source relay node for wireless transmitting to the UE; determining, at the source relay node, that the UE is to undergo a handoff from the source relay node to a target entity comprising either a target relay node or a target evolved NodeB (eNodeB); sending, by the source relay node, a store request to the network gateway, wherein the sending is performed responsive to the determination that the UE is to undergo the handoff; receiving the store request at the network gateway; storing, at the network gateway, the packet data addressed to the UE, wherein the storing is performed responsive to the store request, and wherein the received packet data stored at the network gateway are not forwarded to the source relay node; sending, by the target entity, a forward request to the network gateway after the target entity has received a sequence number (SN) status transfer from the source relay node; forwarding, from the network gateway to the target entity, the stored packet data addressed to the UE, wherein the forwarding is performed responsive to receiving of the forward request at the network gateway; and receiving, from the network gateway, the stored packet data for wirelessly transmitting to the UE.

In accordance with another embodiment, a method to facilitate UE handoff within a packet data communication system includes receiving, from a source relay node, a first request, and wherein the source relay node is one which is servicing the UE that is undergoing a handoff from the source relay node to a target entity; responsive to the first request, storing at a network entity servicing the UE, packet data addressed to the UE; receiving, from a target entity, a second request; and responsive to the second request, forwarding the stored packet data from the network entity to the target entity for wirelessly transmitting to the UE.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). A long term evolution (LTE) type cellular network of UMTS is under discussion by the 3rd generation partnership project (3GPP) that standardized UMTS.

Various embodiments will be presented herein in the context of a wireless communication network and associated entities configured in accordance with the LTE system. However, alternatives to such implementations are envisioned, and teachings with regard to LTE are generally applicable to other standards and air interfaces as well. Moreover, the use of certain terms to describe various embodiments should not limit such embodiments to a certain type of wireless communication system, such LTE. Various embodiments are also applicable to other wireless communication systems using different air interfaces and/or physical layers including, for example, frequency division multiple access (FDMA), time division multiple access (TDMA), code division multiple access (CDMA), wideband CDMA (W-CDMA), LTE-Advanced, and the global system for mobile communications (GSM). By way of non-limiting example only, further description will relate to an LTE system, but such teachings apply equally to other system types.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Figure 1:
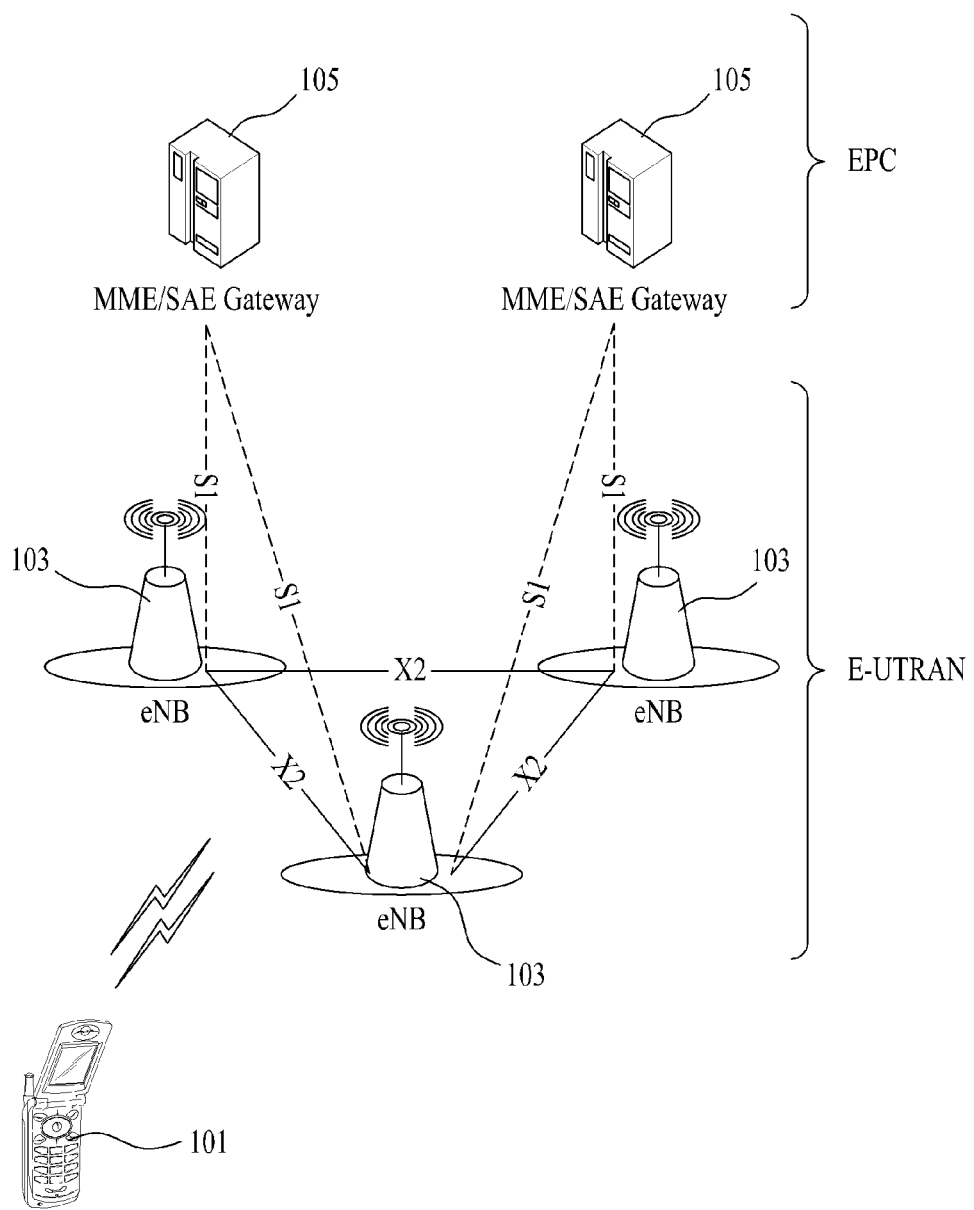
FIG. 1 is a block diagram illustrating a network structure of an evolved universal terrestrial radio access (E-UTRA) system.

FIG. 1 is a block diagram illustrating a network structure of an evolved universal terrestrial radio access (E-UTRA) system. This network may be configured to function using the various features described in more detail in conjunction with later figures. The E-UTRAN may be also referred to as an LTE system. The communication system may be widely deployed to provide a variety of communication services such as voice and packet data.

With reference to FIG. 1, the E-UTRA system includes an evolved UMTS terrestrial radio access network (E-UTRAN) and an evolved packet core (EPC) and one or more user equipment (UE) devices 101. The E-UTRAN may include one or more evolved NodeBs (eNodeB or eNB) 103, and a plurality of UEs 101 may be located in one cell. The E-UTRAN may also include one or more relay nodes (RN) such that one or more of the ENodeBs 103 may alternatively or additionally be implemented using a RN, which in turn functionally cooperates with UE 101, other ENodeBs 103, and the gateway 105. The RN typically also facilitates communication between a UE 101 and a source eNodeB 103. In such a role, the RN may be referred to as a "source RN." In addition, the eNodeB 103 corresponding to the source RN may be referred to as a "donor eNodeB" (DeNB). In the context of a handover (HO) from a particular source eNodeB, another of the eNodeBs may be selected as a target eNodeB for a particular UE 101.

One or more E-UTRAN mobility management entity (MME)/system architecture evolution (SAE) gateways 105 may be positioned at the end of the network and connected to an external network. The MME/SAE gateway 105 provides an end point of a session and mobility management function for the UE 101. The eNodeB 103 and the MME/SAE gateway 105 may be connected via an S1 interface.

The gateways 105 may include (or be in communication with) a serving gateway (S-GW) and/or a packet data network (PDN) gateway (P-GW). When a source RN facilitates communication between the UE 101 and a DeNB 103, the network may include an S-GW and/or a P-GW of the source RN, and an S-GW and/or a P-GW of the UE 101.

A plurality of nodes may be connected between the eNodeB 103 and the gateway 105 via the S1 interface. The eNodeBs 103 may be connected to one another via an X2 interface and neighboring eNodeBs may have a meshed network structure that has the X2 interface.

As used herein, the term "downlink" refers to communication from an eNodeB 103 to the UE 101 (or communication from a DeNB 103 to a source RN and then to the UE 101), and the term "uplink" refers to communication from the UE 101 to an eNodeB 103 (or communication from the UE 101 to the source RN and then to the DeNB 103).

The UE 101 refers to communication equipment carried by a user and may be also be referred to as a mobile station (MS), a user terminal (UT), a subscriber station (SS) or a wireless device.

The eNodeB 103 is generally a fixed station that communicates with UE 101, and may also be referred to as a base station (BS) or an access point. One eNodeB 103 may be deployed per cell. An interface for transmitting user traffic or control traffic may be used between eNodeBs 103.

The eNodeB 103 provides end points of a user plane and a control plane to the UE 101. The eNB hosts (or performs) various functions. The various functions include functions related to Radio Resource Management (RRM): for example, Radio Bearer Control (RBC), Radio Admission Control (RAC), Connection Mobility Control (CMC), and dynamic allocation of resources to UEs in both uplink and downlink (scheduling). The functions hosted by the eNB also include IP header compression and encryption of user data stream(s), and selection of an MME at UE attachment when no routing to an MME can be determined from the information provided by the UE. The functions also include routing of user plane data towards a serving gateway, scheduling and transmission of paging messages (originated from the MME), and scheduling and transmission of broadcast information (originated from the MME or O&M). The functions also include measurement and measurement reporting configuration for mobility and scheduling, and scheduling and transmission of ETWS (earthquake tsunami warning system) messages (originated from the MME).

The MME 105 is responsible for managing and storing UE contexts, generating temporary identifiers to the UEs, idle state mobility control, distributing paging messages to eNBs, security control, EPS bearer control, SAE bearer control, and ciphering and integrity protection of non-access stratum (NAS) signaling. The SAE gateway host 105 provides assorted functions including termination of U-plane packets for paging reasons, and switching of the U-plane to support UE mobility. The present disclosure may refer to the MME/

SAE gateway 105 as simply a "gateway." However, it is understood that the gateway may include both an MME and an SAE gateway.

The serving gateway (S-GW) is responsible for anchoring the user plane for inter-eNB handover and inter-3GPP mobility. Furthermore, when RNs are introduced in the cellular network, it is also responsible for anchoring the user plane for inter-RN-eNB handover.

The PDN gateway (P-GW) is responsible for anchoring the user plane for mobility between 3GPP systems and non-3GPP systems. THE P-GW provides support for charging, lawful interception and policy enforcement.

According to the LTE Advanced specifications, an RN may be a device of one of three types—"type 1", "type 2", and "type 3". According to embodiments of the present invention, the RN is a type 1 relay. As such, the RN has full layer 3 (L3) functionality, including a full control of PHY, MAC, RLC, PDCP, and RRC layers. In comparison, a "type 2" or "type 3" RN has relatively lesser capabilities. For example, a type 2 relay has full layer 2 (L2) functionality, such as a certain degree of processing and retransmission of received signals (decode, error correction, etc.). A type 3 relay has full layer 1 (L1) functionality, such as the forwarding of all received signals.

As described previously, a handover of a UE from a source base station (e.g., a source RN) to a target base station (e.g., a target eNodeB) may involve the transfer of data blocks from the source base station (where the data blocks are stored) to the target base station. The present disclosure often refers to such blocks (or packets) as "late packets." Such packets have arrived at a transmit queue of the source base station and are to be delivered to the target base station. However, due to handover-related processing, a delay in the delivery to the target base station occurs, and, therefore, the packets may not be timely delivered to the target base station.

Assorted examples of system architectures utilizing RNs will now be described. Various components of FIG. 1, such the UE, eNodeBs, RNs, and the like, will be shown in various forms in the following figures. For clarity, since such elements are described above, various details with regard to these elements will not be repeated below.

Figure 2:
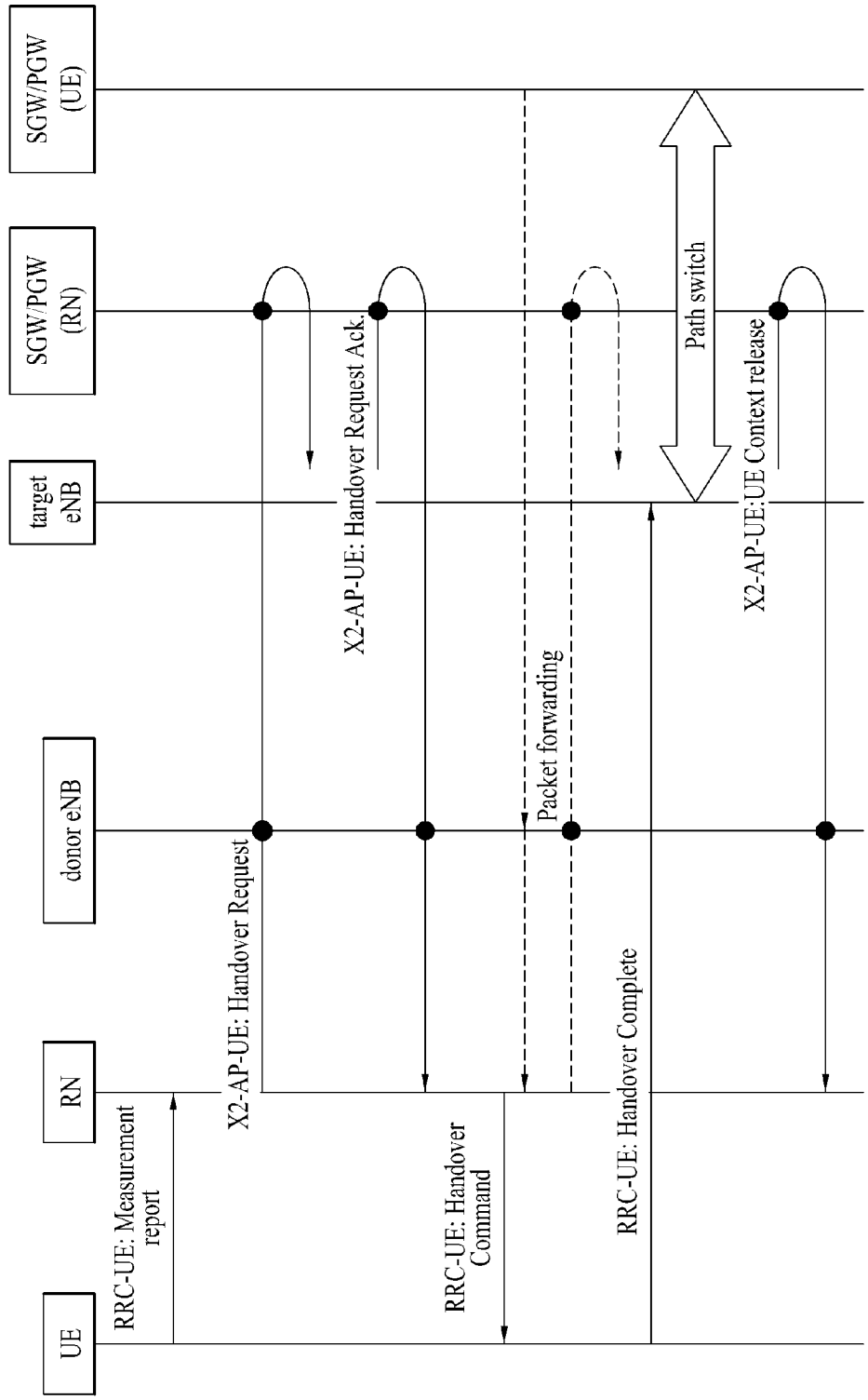
FIG. 2 depicts an operational flowchart of one system architecture.

With reference to FIG. 2, a first architecture will now be described. In this architecture, the S1 interface (e.g., the C-plane of the S1 interface) terminates at the RN. Also, the movement of packets is transparent to the donor eNB. That is, the donor eNB simply provides backhaul connectivity for its underlying RN and does not interpret any of the S1-AP messages passing through it.

With continued reference to FIG. 2, S1-AP messages sent between the MME (serving a given UE connected to the RN) and the RN are delivered via the DeNB and the P/S-GW of the RN. The P/S-GW maps the S1-AP packets to a backhaul link EPS bearer established between the RN and the P/S-GW and sends the packets in the corresponding GPRS Tunneling Protocol (GTP) tunnel to the DeNB. As described above, the DeNB simply provides backhaul connectivity for the RN and does not interpret any of the S1-AP messages passing through it. Thus, the transfer of packets is considered to be transparent to the DeNB With continued reference to FIG. 2, a handover procedure will now be described. The UE is handed over from the RN to a target eNB (or to another RN connected to a same or different DeNB). The UE provides the RN with a measurement report. The RN makes a handover decision based on the UE measurement report and selects a target cell (e.g., a target eNB). The RN sends a Handover Request message to the target eNB over an EPS bearer that is provided by the DeNB and the S/P-GW of the RN. The target eNB receives the Handover Request message and may reply with a Handover Request Acknowledgement (Handover Request Ack) message. The Handover Request Ack message is routed to the RN over the EPS bearer via the S/P-GW of the RN and the DeNB. Then, forwarding tunnels are established from the RN to the target eNB over EPS bearer(s) via the DeNB and the S/P-GW of the RN. Forwarding of packets from the RN to the target eNB may then occur.

Figure 3:
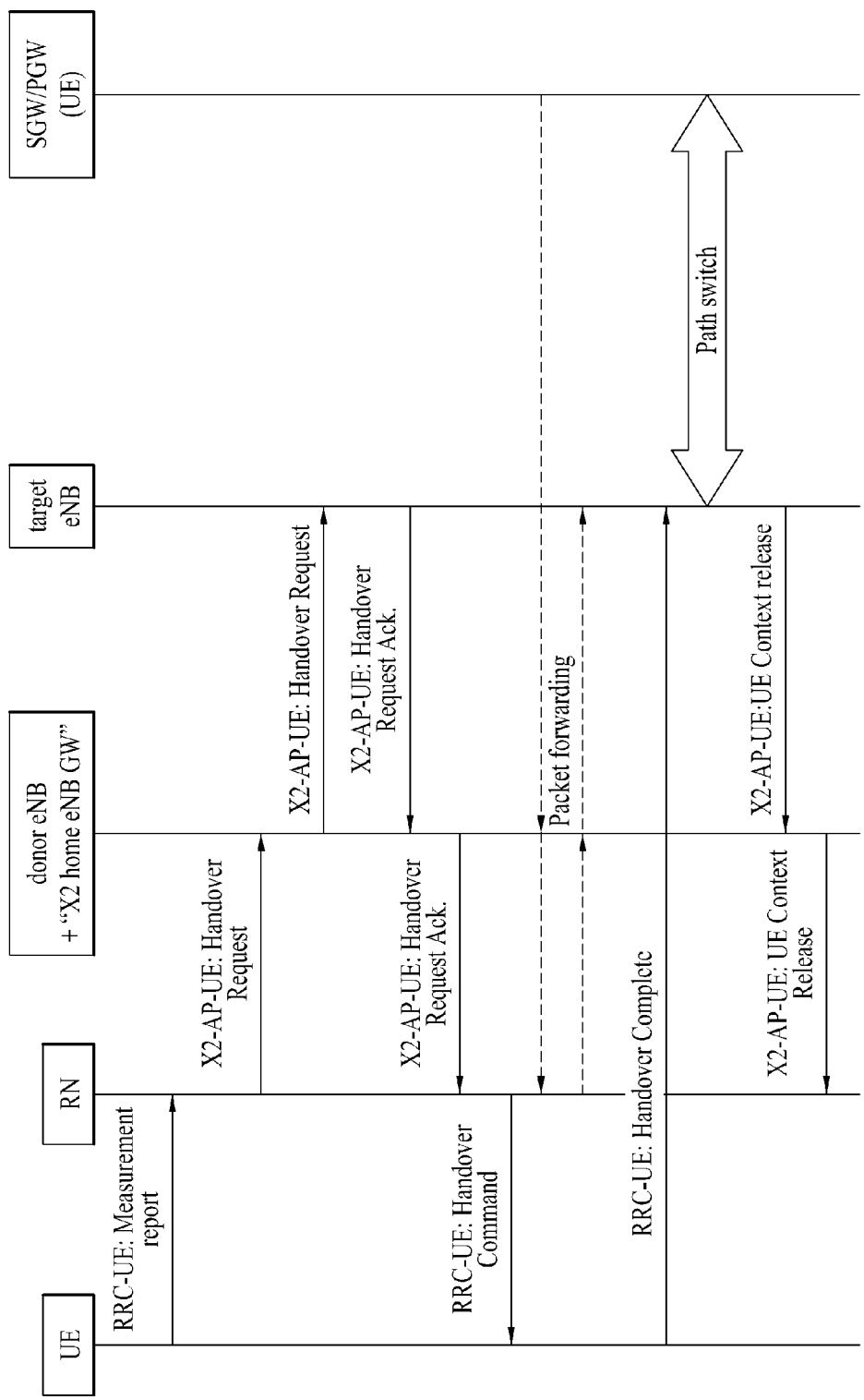
FIG. 3 depicts an operational flowchart of another system architecture.

With reference to FIG. 3, a second architecture will now be described. In this architecture, the transfer of packets through the DeNB is not transparent to the DeNB. The RN terminates the S1 protocol (both control plane and user plane), and the DeNB terminates the S1 protocol both towards the RN and towards the EPC pool. S1-AP messages are sent between the MME and the DeNB, and between the DeNB and the RN. Upon arrival of the S1-AP messages at the DeNB, the DeNB translates the UE IDs between the two interfaces by modifying the S1-AP UE IDs in the message but leaving other parts of the message unchanged. As such, the S1-AP proxy operation would be transparent for the MME and the RN. That is, from the perspective of the MME, it appears that the UE is directly connected to the DeNB. From the perspective of the RN, it appears that the RN is directly connected to the MME.

With continued reference to FIG. 3, a handover procedure will now be described. The UE is handed over from the RN to a target eNB (or to another RN connected to a same or different DeNB). The UE provides the RN with a measurement report. The RN makes a handover decision based on the UE measurement report and selects a target cell. The RN sends the Handover Request message to the DeNB. The DeNB finds the target eNB corresponding to the target cell ID and forwards the X2 message toward the target eNB. The target eNB receives the X2 message from the DeNB, and the Handover Request is acknowledged. Then, forwarding tunnels are established from the RN via the DeNB to the target eNB. The GTP tunnels can be switched at the DeNB. Because the DeNB can access the UE bearer forwarding tunnels and because it is cognizant of the handover, the DeNB may bypass forwarding of packets during a handover, in order to reduce an unnecessary transfer of packets (e.g., from the source RN to the S-P/GW of the RN and to the target eNB).

Figure 4A:
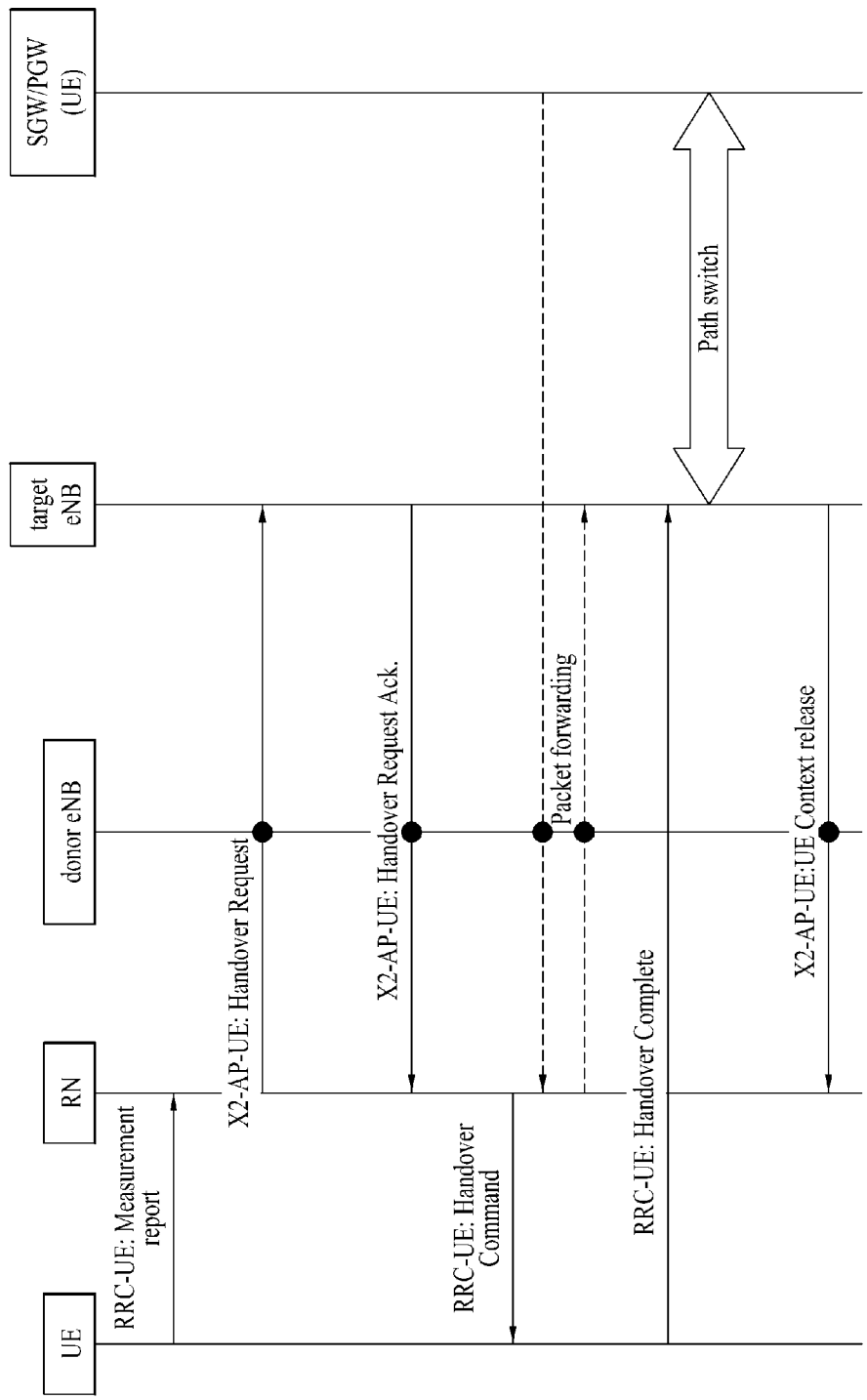
FIG. 4A depicts an operational flowchart of another system architecture.

With reference to FIG. 4A, another architecture will now be described. Similar to the architecture of FIG. 2, the transfer of packets through the DeNB is transparent to the DeNB. With reference to FIG. 4A, the C-plane of the S1 interface is terminated at the RN. The DeNB delivers S1-AP messages related to the UE and that are sent between the MME and the RN. The DeNB effectively serves as an IP router and does not interpret any of the S1-AP messages passing through it. Therefore, the transfer of packets is considered to be transparent to the donor eNB.

With continued reference to FIG. 4A, a handover procedure will now be described. The UE is handed over from the RN to a target eNB (or to another RN connected to a same or different DeNB). The UE provides the RN with a measurement report. The RN makes a handover decision based on the UE measurement report and selects a target cell (i.e., a target eNB). The RN sends the Handover Request message to the target eNB. The target eNB receives the message and may reply with a Handover Request Ack message which is routed via the DeNB back to the RN. Then, forwarding tunnels are established from the RN to the target eNB via the DeNB. Forwarding of packets from the RN to the target eNB may then occur.

Figure 4B:
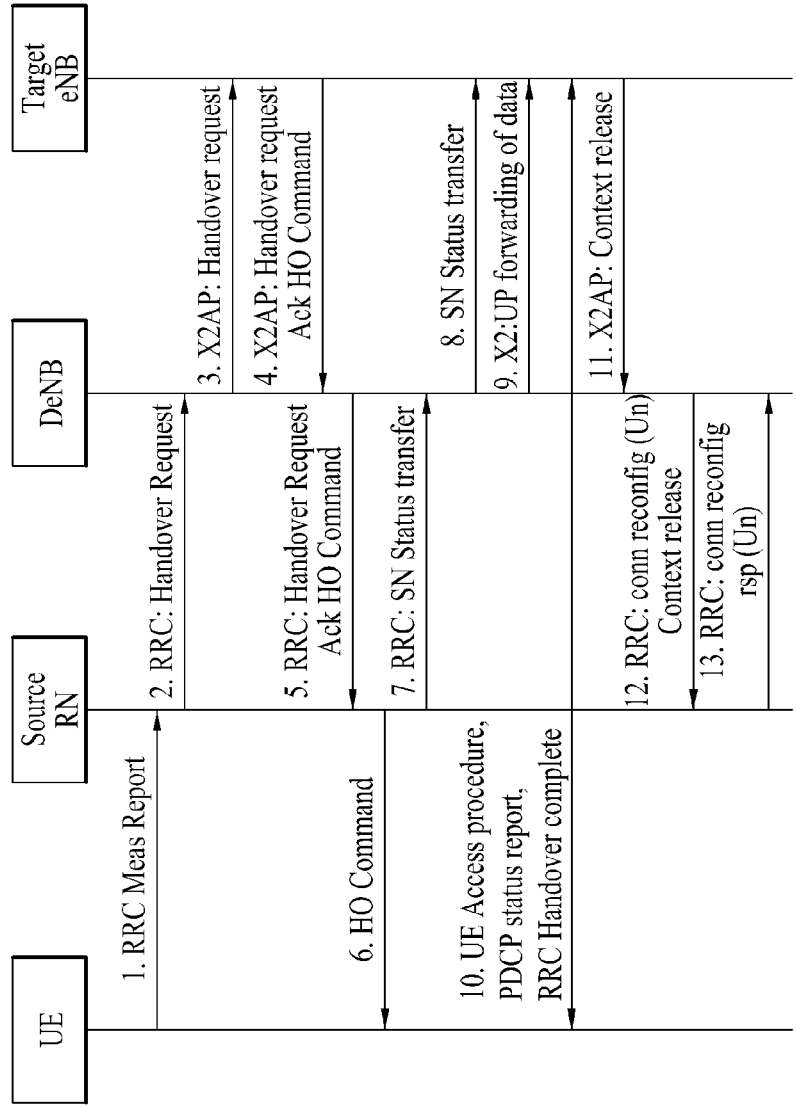
FIG. 4B depicts an operational flowchart of another system architecture.

With reference to FIG. 4B, yet another architecture will now be described. Operation 1 includes sending an RRC measurement report from the UE to the source RN, which then sends an RRC handover request to the DeNB (operation 2). A handover request and acknowledgement are exchanged in operations 3 and 4. The handover request acknowledgment command is then forwarded to the source RN, and an handover command is sent to the UE (operations 5 and 6). In addition, a sequence number (SN) status transfer is sent to the target eNB via the DeNB in operations 7 and 8. In some scenarios, there is forwarding of data from the DeNB to the Target NB (operation 9). In operation 10, there is communication between the UE and target eNB (e.g., access procedures PDCP status report, handover complete, etc.). Operation 11 includes sending an X2AP context release to the DeNB, and then the DeNB sends a connection reconfiguration (context release) communication to the source RN. The source RN then sends a connection reconfiguration response (up) to the DeNB.

Figure 5:
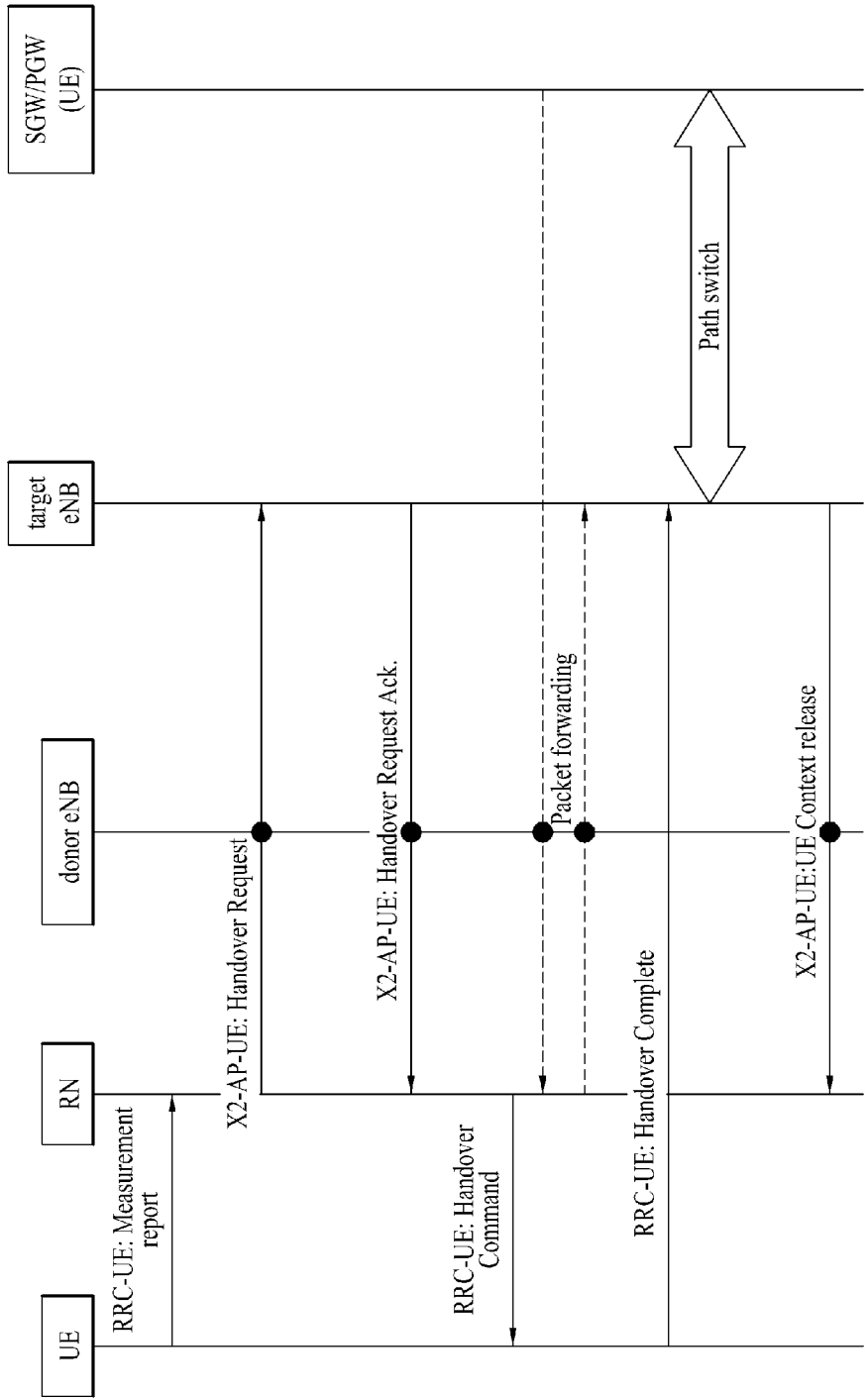
FIG. 5 depicts an operational flowchart of another system architecture.

With reference to FIG. 5, a fourth architecture will now be described. Similar to the architecture of FIG. 3, the transfer of packets through the DeNB is not transparent to the DeNB. In the architecture of FIG. 5, the C-plane of the S1 interface is terminated at the DeNB. S1-AP messages are sent between the MME and the DeNB.

With continued reference to FIG. 5, a handover procedure will now be described. The UE is handed over from the RN to a target eNB (or to another RN connected to a same or different DeNB). The UE provides the RN with a measurement report. The RN makes a handover decision based on the UE measurement report and selects a target cell. The RN sends the Handover Request message to the DeNB. The DeNB finds the target eNB corresponding to the target cell ID and forwards the X2 message toward the target eNB. The DeNB could use this information to, e.g., start buffering data in the downlink, such that delivery of downlink data over Uu (FFS) is stopped.

The target eNB prepares the handover command and responds with an acknowledgement of the handover request message. The response of the target eNB is forwarded to the source RN by the DeNB. The handover command is sent to the UE by the source RN. The source RN sends the sequence numbers status to the DeNB. In addition to reporting status for the Uu interface, this information sent to the DeNB may also include sequence numbers referring to PDCP used over the Un interface, and the DeNB may use this information to determine what data to forward to the target eNB. The DeNB forwards the Uu sequence number status information to the target eNB. The DeNB forwards data to the target eNB.

In situations in which the S1 protocol is transparent to the DeNB (see, e.g., the architectures of FIGS. 2 and 4A, there is a possibility that radio resources may be unnecessarily consumed in the forwarding of packets to the target eNB. In addition, this transparency may cause an increase in the delay of packets arriving at the target eNB as well as an increase in the number of packets arriving at the target eNB in an untimely manner. Such packets were previously described as "late packets." The phenomena noted above will now be described with reference to two scenarios. Both of these scenarios will be described with reference to the architecture of FIG. 2, but the points raised generally apply to the other figures as well.

Figure 6:
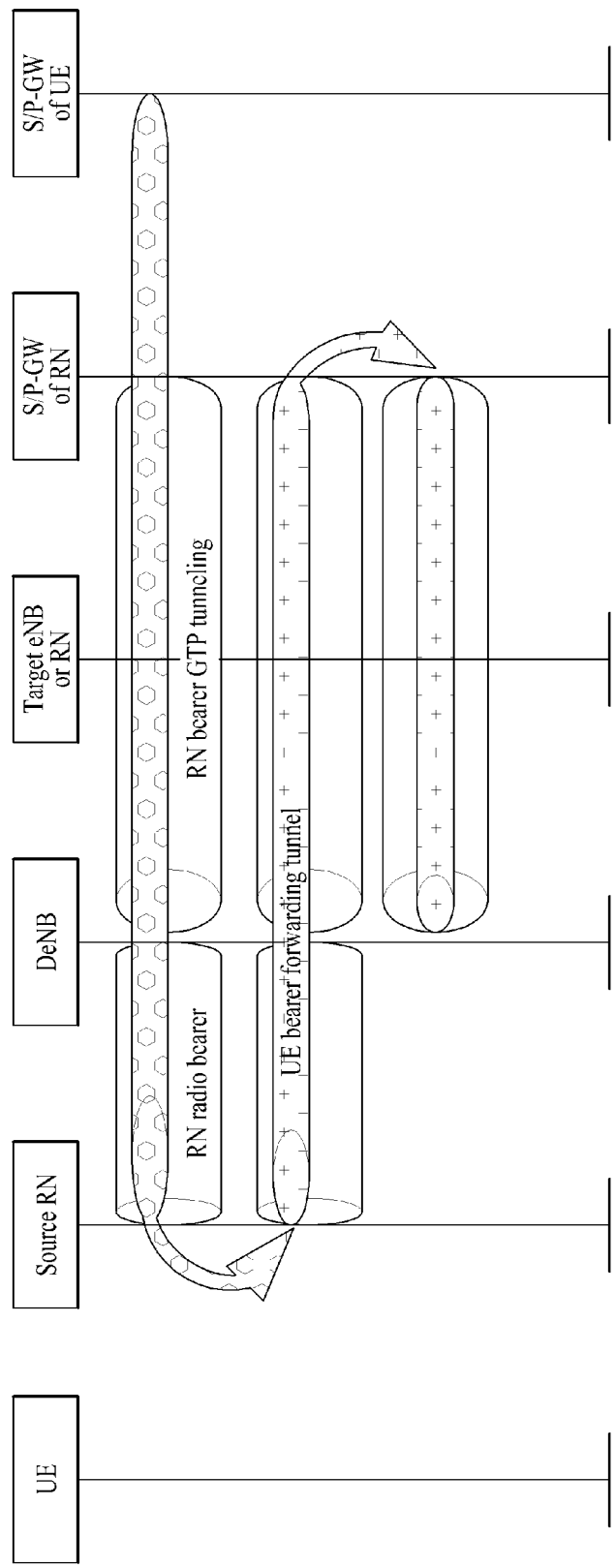
FIG. 6 depicts one example of a forwarding tunnel.

As previously described with reference to FIG. 2, forwarding tunnels are established from the RN to the target eNB over EPS bearer(s) via the DeNB and the S/P-GW of the RN. With reference to FIG. 6, a first scenario will now be described. The forwarding tunnel 601 terminates at the DeNB. As such, packets addressed to the UE are transported over at least three hops during a handover: (1) from the S/P-GW of the UE to the source RN serving the UE; (2) from the source RN to the S/P-GW of the RN; and (3) from the S/P-GW of the RN to the DeNB.

Figure 7:
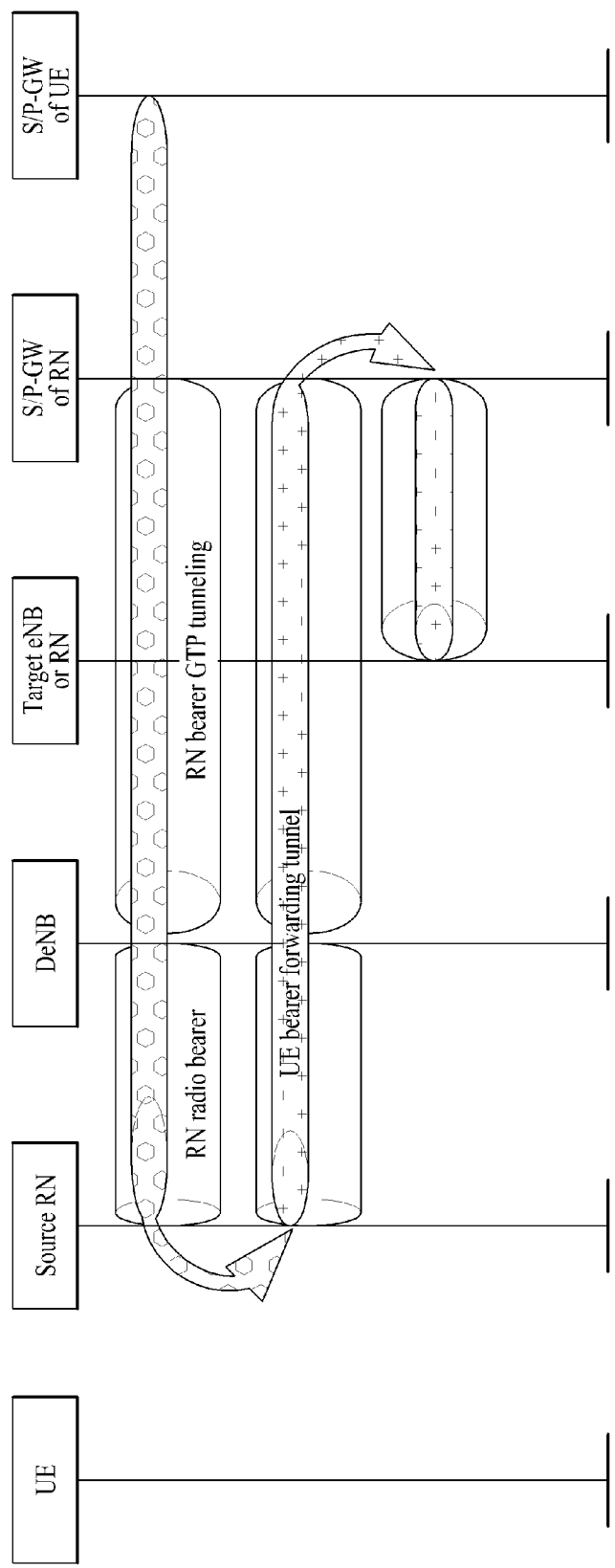
FIG. 7 depicts another example of a forwarding tunnel.

With reference to FIG. 7, a second scenario will now be described. The forwarding tunnel in this figure extends to the Target eNB and terminates at the Target eNB. As such, the packet data is transported over at least three hops during a handover: (1) from the S/P-GW of the UE to the Source RN; (2) from the Source RN to the S/P-GW of the RN; and, finally, (3) from the S/P-GW of the RN to the Target eNB.

In the scenarios described above with reference to FIGS. 6 and 7, the forwarding of packets to and from the source RN requires the packets to travel through additional hops (or paths) and therefore incurs additional latency. Also, a particular call (or data transfer) occurring during a handover may be handed over from the source RN. During such an event, the call may require approximately three times the quantity of radio resources relative to the quantity needed in architectures in which the transfer of packets through the DeNB is not transparent to the DeNB (see, for example, the architectures of FIGS. 3 and 5, in which the DeNB is cognizant of the S1 packets). In architectures where the DeNB is cognizant of the S1 packets, the DeNB can better control and manage the transfer of the data, as needed.

As such, in systems employing RNs, consumption of radio resources is increased as data packets travel through additional hops, whether the S1 protocol is terminated at the DeNB (see, for example, FIG. 6) or at the Target eNB (see, for example, FIG. 7). In addition, the re-direction of data packets may cause delays in the radio and/or wired transmission of the data packets. For example, with regard to radio resources, the forwarding of packets from the RN to the DeNB requires radio resources. As another example, with regard to delay, all of the "late packets" are required be forwarded through the forwarding tunnel to the S/P-GW of the RN (see, for example, FIGS. 6 and 7). If traffic load is heavy at the time (e.g., the traffic load is temporarily heavy) and/or if resource assignment on the relay uplink is not sufficient at the time of the forwarding, the forwarding of the packets may experience extra delay.

As such, embodiments of the invention are directed to, among other things, reducing the number of late packets, e.g., the number of packets that are forwarded from the source RN to the S/P-GW of the RN, for eventual delivery to the UE. As will be described in more detail below, the creation of late packets may not be completely eliminated. However, the number of such packets may be greatly reduced, relative to the numbers that may be created in the architectures of FIGS. 2 and 4.

According to embodiments of the invention, the number of late packets may be reduced by reducing the length of time between the start of the handover preparation period and the time that the serving gateway effectively learns that handover preparation will be starting. According to a particular embodiment, the serving gateway is effectively informed of the upcoming handover at the start of the handover preparation period. For example, the serving gateway is informed of the upcoming handover after it is determined that the UE is to undergo a handover and before a handover request is sent to a target eNB.

Because the number of late packets is reduced, the consumption of radio resources is also reduced. For example, a fewer number of packets are sent by the serving gateway of the UE to the source RN and then back up to the serving gateway of the RN. Accordingly, delay in the delivery of data packets is also reduced.

Various figures will now be described with reference to FIG. 8. It is understood that such a procedure may be implemented in a system such as the system of FIG. 1. With reference to operation 0, the UE context within the base station (e.g., a source eNB such as eNB 103 of FIG. 1) is provided. The UE context contains information regarding roaming restrictions, which were provided either at connection establishment or at the last tracking area (TA) update.

With reference to operation 1, the source eNB configures the UE measurement procedures according to the area restriction information described with reference to operation 0. For example, the source eNB controls the UE to provide certain measurements in accordance with the area restriction information. Measurements provided by the source eNB may assist the controlling of the UE's connection mobility.

It is understood, that, concurrently, uplink data packets may be sent from the UE to the serving gateway (e.g., MME/SAE gateway 105 of FIG. 1) via the source eNB. Similarly, downlink data packets may be sent from the serving gateway to the UE via the source eNB.

In addition, the source eNB may send uplink (UL) allocation information to the UE, such that the UE can then send measurement information on the uplink using appropriately allocated UL resources.

With reference to operation 2, the UE sends a measurement report to the source eNB. In more detail, the UE may send, in the form of a measurement report, information related to certain communication characteristics of the UE. The UE may send such information upon occurrence of certain situations defined by the network (e.g., the base station). According to these situations, the measurement report may be sent periodically or upon the occurrence of an event.

With reference to operation 3, the source eNB makes a decision to hand over the UE, based on the measurement report and radio resource management (RRM) information. In more detail, based upon the received information, the source eNB makes a handover (HO) decision to move (e.g., hand over) the UE to a cell of a target eNodeB.

With reference to operation 4, the source eNB issues to the target eNB a handover request message. At this stage, the handover preparation procedure is initiated. The handover request message contains information necessary for the target eNB to prepare for the handover. The message includes the bearers to be setup by the target eNB. Context data included in the message may include UE X2 signaling context reference at the source eNB, UE S1 EPC signaling context reference, target cell ID, $K_{eNB}^*$, RRC context including the C-RNTI of the UE in the source eNB, AS-(access stratum-) configuration, E-RAB context, and physical layer ID of the source cell+MAC for possible RLF recovery. The UE X2/UE S1 signaling references enable the target eNB to address the source eNB and the EPC. The E-RAB context includes necessary RNL and TNL addressing information, and QoS profiles of the E-RABs.

With reference to operation 5, the target eNB is selected as the eNB to which the UE will be handed over. If the target eNB can grant the required resources, it performs the Admission Control procedure based on the received E-RAB QoS information (of operation 4) to increase the likelihood of a successful HO. The target eNB configures the required resources according to the received E-RAB QoS information and reserves a C-RNTI and optionally a RACH preamble. The AS-configuration to be used in the target cell can either be specified independently (i.e., as an "establishment") or as a delta compared to the AS-configuration used in the source cell (i.e., as a "reconfiguration"). Upon receipt of the context data, the target eNB stores the context data (e.g., UE RAN context) and reserves certain identifiers (e.g., C-RNTI). Then the Target eNB may send context confirmation back to the source eNB, where the context confirmation may include the new C-RNTI and other information, as described in more detail below.

With reference to operation 6, the Target eNB prepares the handover L1/L2 signaling and sends the handover request acknowledgement message to the Source eNB. This message includes a transparent container to be sent to the UE as an RRC message for performing the handover. The container includes a new C-RNTI and target eNB security algorithm identifiers for the selected security algorithms, and may include a dedicated RACH preamble and other parameters, e.g., access parameters, SIBs, etc. The message may also include RNL/TNL information for the forwarding tunnels, if necessary. As soon as the source eNB receives the handover request acknowledgement message (or as soon as the transmission of the handover command is initiated in the downlink), data forwarding may be initiated, as will be explained in more detail below.

The handover preparation phase is completed upon the reception of the handover request acknowledgement message in the Source eNB. The message includes at least radio interface related information (e.g., an HO command for the UE), successfully established E-RAB(s) and failed established E-RAB(s). If the handover resource allocation is not successful (because, e.g., no resources are available on the target side), the target eNB responds with the handover preparation failure message instead of the handover request acknowledgement message.

Operations described in more detail below (i.e., operations 7 to 16) are directed to, for example, avoiding data loss during handover. Upon receiving context confirmation, the source eNB sends downlink (DL) allocation information to the UE. Also, the source eNB may send a handover command to the UE. The handover command may include a new C-RNTI and other information.

As previously described, the target eNB generates an RRC message to perform the handover. With reference to operation 7, the RRC connection reconfiguration message, which includes mobility control information, is sent to the UE by the source eNB. The Source eNB performs the necessary integrity protection and ciphering of the message. The UE receives the RRC connection reconfiguration message along with necessary parameters (e.g., new C-RNTI, target eNB security algorithm identifiers, optionally dedicated RACH preamble, target eNB SIBs, etc.). Further, the UE is commanded by the source eNB to execute the handover. The UE does not need to delay the handover execution for delivering HARQ/ARQ responses to the Source eNB.

Thereafter, the UE may perform procedures to detach from the old cell (i.e., the source eNB) and synchronize with the new cell (i.e., the target eNB). Here, the source eNB delivers the buffered and in-transit packets to the target eNB. That is, the source eNB delivers buffered user data to the target eNB. Upon receipt, the target eNB stores (buffers) the packets received from the source eNB.

Also, the source eNB sends status information to the target eNB to indicate the most recent information regarding transmission and/or reception of packets (user data). The sequence number (SN) status transfer message is used to manage forwarding of user plane data. With reference to operation 8, the source eNB sends the SN status transfer message to the target eNB to convey the uplink PDCP SN receiver status and the downlink PDCP SN transmitter status of E-RABs for which PDCP status preservation applies (e.g., for RLC AM). The uplink PDCP SN receiver status includes at least the PDCP SN of the first missing UL SDU and may include a bit map of the receive status of the out-of-sequence UL SDUs (if any) that the UE needs to retransmit in the target cell. The downlink PDCP SN transmitter status indicates the next PDCP SN that the target eNB shall assign to new SDUs that do not have a PDCP SN yet. The source eNB may omit sending this message if none of the E-RABs of the UE is to be treated with PDCP status preservation.

Thereafter, the UE can begin to access the target eNB upon re-establishing the radio environment by sending, to the target eNB, parameters including timing synchronization. With reference to operation 9, after receiving the RRC connection reconfiguration message including the mobility control information, the UE performs a synchronization to the target eNB. The UE accesses the target cell via RACH, following a contention-free procedure if a dedicated RACH preamble was indicated in the mobility control information, or following a contention-based procedure if no dedicated preamble was indicated. The UE derives target-eNB specific keys and configures the selected security algorithms to be used in the target cell.

The target eNB then sends information to the UE related to uplink (UL) allocation of resources and timing adjustment. With reference to operation 10, the target eNB sends this information to the UE.

In response, the UE sends a confirmation regarding handover (e.g., a handover confirmation message) to the Target eNB. Additionally, the UE may send information regarding the status of transmitted and received packets (e.g., a status report) to the target eNB. With reference to operation 11, when the UE has successfully accessed the target cell, the UE sends the RRC connection reconfiguration complete message (C-RNTI) to confirm the handover, along with an uplink Buffer Status Report, whenever possible, to the target eNB to indicate that the handover procedure is completed for the UE. The target eNB verifies the C-RNTI sent in the RRC connection reconfiguration complete message. The target eNB can now begin sending data to the UE.

With reference to operation 12, the target eNB sends a path switch message to the MME to inform the MME that the UE has changed cells (i.e., from the source eNB to the target eNB). Upon being informed of the updated UE location (i.e., of the UE handover completion), the core network (MME/UPE) performs path switching such that packets that would have been sent to the source eNB before handover are now to be sent to the target eNB after handover. As a result, the target eNB transfers the packets received from the core network to the UE such that the user continues to receive the desired user data or packets in a seamless manner during and after handover.

With reference to operation 13, the MME sends an update user plane request message to the serving gateway. With reference to operation 14, the serving gateway switches the downlink data path to the target eNB. The serving gateway sends one or more "end marker" packets on the former path (i.e., the path to the source eNB) and then can release any U-plane/TNL resources towards the Source eNB. With reference to operation 15, the serving Gateway sends an update user plane response message to the MME. With reference to operation 16, the MME confirms the path switch message with a path switch acknowledgement message.

With reference to operation 17, the target eNB sends a UE context release message to the source eNB. In doing so, the target eNB informs the source eNB that the handover is successful and triggers the release of resources by the source eNB. The target eNB sends this message after the path switch acknowledgement message is received from the MME.

With reference to operation 18, upon receipt of the UE context release message, the source eNB can release radio and C-plane related resources associated with the UE. Ongoing data forwarding may continue.

In the handover procedure described above with reference to FIG. 8, while the handover is in progress (i.e., before handover completion), the core network may continue to send, to the source eNodeB, packet data that is addressed to the UE. The core network may continue to send such data to the source eNodeB because it has not been informed of the fact that the UE is undergoing a handover to the target eNB. As such, after completion of the handover (see, e.g., operation 11), the source eNodeB flushes its downlink (DL) buffer and continues to deliver any UE-addressed packets that are in-transit. That is, any packets (or user data) received by the source eNodeB while handover is being performed are forwarded to the target eNB, which then proceeds to send the packets to the UE. The transfer of packets from the core network to the source eNodeB and from the source eNodeB to the target eNB consumes radio resources.

Embodiments of the present invention are directed to decreasing the consumption of radio resources and the associated delay during the processing of a handover. In particular embodiments, a source RN is employed to relay information between a UE and a source eNodeB. Exemplary embodiments will be described with reference to FIG. 9.

According to embodiments of the invention, the serving gateway of the UE is directed to stop the forwarding of packets from the core network to the source RN, once the source RN has determined that the UE is to be handed over. According to a particular embodiment, the source RN directs the serving gateway to stop this forwarding once it has made a handover decision to hand over the UE to a cell of a target eNodeB. The stopping (or preemption) of the packet forwarding relieves the system of the work associated with transferring data from the serving gateway of the UE to the source RN, from the source RN to the S/P-GW of the RN, and, finally, from the S-P-GW of the RN to the DeNB (as described earlier, for example, with reference to FIG. 2). Similarly, the stopping of the packet forwarding relieves the system of the work associated with transferring data from the S-P-GW of the UE to the Source RN, from the Source RN to the S/P-GW of the RN, and, finally, from the S-P-GW of the RN to the target eNB (as described earlier, for example, with reference to FIG. 3).

Rather, packets that otherwise would have been forwarded to the source RN are stored at the S/P-GW of the UE. The packets are stored for later delivery to the target eNB. Upon delivery of the packets to the target eNB, the source RN may erase any "late packets" from its queue.

Figure 8:
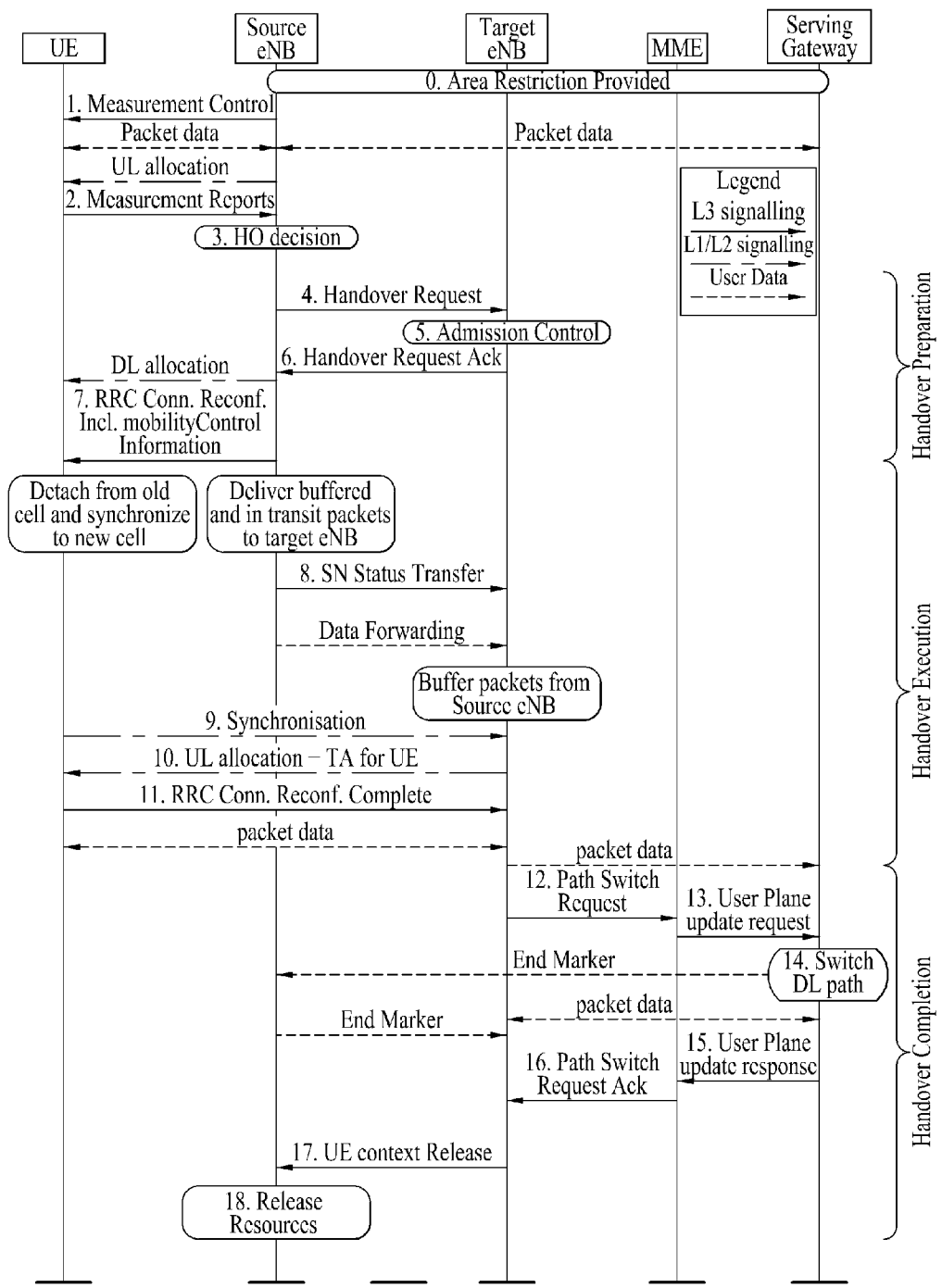
FIG. 8 depicts a flow diagram of a handover procedure.
Figure 9:
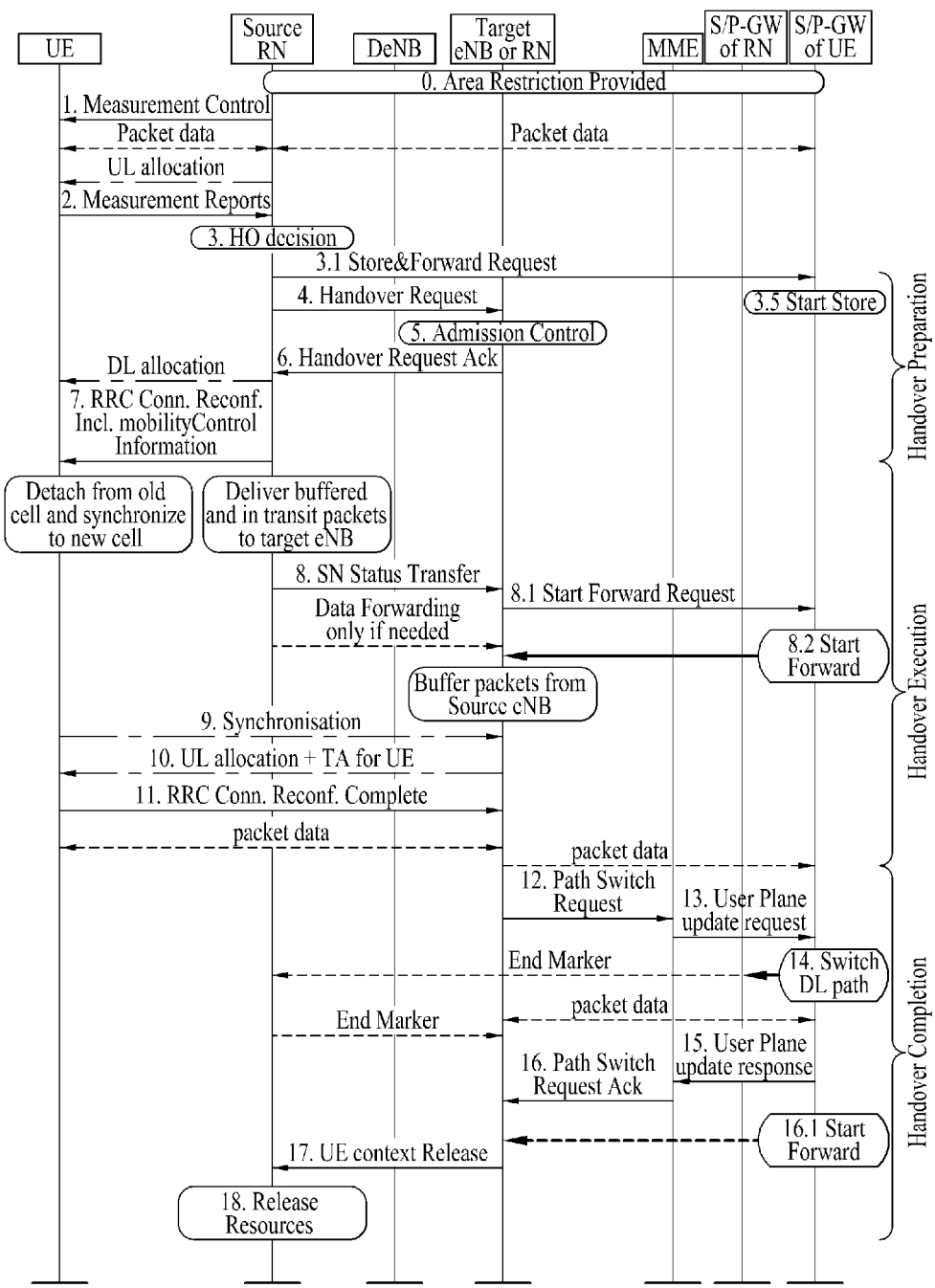
FIG. 9 depicts a flow diagram of a handover procedure according to one embodiment.

In FIG. 9, some distinctions relative to FIG. 8 are identified using fractional identifiers (e.g., operation 3.1, operation 8.1). Also, in FIG. 9, solid arrows represent signal flow (e.g., the flow of a control signal or a control message), and dotted arrows represent user data flow.

Embodiments of the invention will now be described in more detail with reference to FIG. 9. With reference to operation 0, the UE context within a source RN is provided. The UE context contains information regarding roaming restrictions, which were provided either at connection establishment or at the last tracking area (TA) update. It is understood that packet data addressed to the UE is forwarded from the network gateway serving the UE to the source RN for wireless transmission to the UE.

With reference to operation 1, the source RN configures the UE measurement procedures according to the area restriction information described with reference to operation 0. For example, the source RN controls the UE (e.g., UE 101 of FIG. 1) to provide certain measurements in accordance with the area restriction information. Measurements provided by the source RN may assist the controlling of the UE's connection mobility.

It is understood, that, concurrently, uplink data packets may be sent from the UE to the serving gateway (e.g., MME/SAE gateway 105 of FIG. 1) via the source RN. Similarly, downlink data packets may be sent from the serving gateway to the UE via the source RN.

In addition, the source RN may send uplink (UL) allocation information to the UE, such that the UE can then send measurement information on the uplink using appropriately allocated UL resources.

With reference to operation 2, the UE sends a measurement report to the source RN. In more detail, the UE may send, in the form of a measurement report, information related to certain communication characteristics of the UE. The UE may send such information upon occurrence of certain situations defined by the network (e.g., the base station). According to these situations, the measurement report may be sent periodically or upon the occurrence of an event.

With reference to operation 3, the source RN makes a decision to hand off the UE, based on the measurement report and radio resource management (RRM) information. In more detail, based upon the received information, the source eNB makes a handover (HO) decision to move (i.e. hand over) the UE to a cell of a target entity (e.g., a target eNodeB or a target RN). As such, the source RN determines that the UE is to undergo a handover from the source RN to the target entity (e.g., a target eNB or a target RN).

After the source RN has determined that the UE is to undergo a handover, the source RN sends a request to the network so that packet data addressed to the UE is stored at the network. According to a particular embodiment, the network is requested to stop (or preempt) forwarding of the stored packet data to the source RN. That is, upon receipt of the request, the network will begin storing the data that is addressed to the UE. Concurrently, the network will keep from sending the stored data to the source RN. Rather, the forwarding of the data to the source RN is preempted.

With reference to operation 3.1, the source RN sends a "Store&Forward Request" message (e.g., a "Start Store Request") to the S/P-GW of the UE.

The message is configured to control the S/P-GW to begin storing packets addressed to the UE and, concurrently, to keep these packets from being sent to the source RN. In the absence of such a request (that is, if the store request were not sent), packets addressed to the UE would continue to be sent to the source RN during the course of the handover (e.g., during the handover preparation phase, during the handover execution phase, etc.). As described previously, such packets would need to be rerouted from the source RN to the S/P-GW of the RN for later transmission to the target eNodeB (or target RN).

With reference to operation 3.5, upon receipt of the Store&Forward request message, the S/P-GW of the UE starts buffering or storing the packets arriving at the S/P-GW and that are addressed to the UE. According to one embodiment, upon receiving the store request at the S/P-GW of the UE, the S/P-GW of the UE stores the packet data addressed to the UE, responsive to the store request. Concurrently, the stored packet data is not forwarded to the source RN.

It is understood that the "late packet" phenomenon may not be completely eliminated. For example, a relatively small number of packets may be forwarded from the S/P-GW of the UE to the source RN, even if a message such as the above-described "store request" message is sent to the S/P-GW of the UE. This may occur because packets that are addressed to the UE may arrive at the S/P-GW after the HO decision is made (operation 3) and/or while the Store request is processed at the S/P-GW of the UE. Such "interim" packets may be forwarded by the S/P-GW to the Source RN. However, it is believed that the number of such "interim" packets will be relatively small and that, therefore, the transfer of such packets will consume relatively little amounts of radio resources. The handling of such packets will be described in more detail below.

With reference to operation 4, the source RN issues to the target eNB (e.g., another eNB 103 of FIG. 1) a handover request message. It is appreciated that the handover request message may also be sent to a target RN. At this stage, the handover preparation procedure is initiated. The handover request message contains information necessary for the target eNB to prepare for the handover. The message includes the bearers to be setup by the target eNB. Context data included in the message may include UE X2 signaling context reference at the source RN, UE S1 EPC signaling context reference, target cell ID, $K_{eNB}^*$, RRC context including the C-RNTI of the UE in the source RN, AS-(access stratum-) configuration, E-RAB context, and physical layer ID of the source cell+MAC for possible RLF recovery. The UE X2/UE S1 signaling references enable the target eNB to address the source RN and the EPC. The E-RAB context includes necessary radio network layer (RNL) and transport network layer (TNL) addressing information, and QoS profiles of the E-RABs.

With reference to operation 5, the target eNB is selected as the eNB to which the UE will be handed over. If the target eNB can grant the required resources, it performs the Admission Control procedure based on the received E-RAB QoS information (of operation 4) to increase the likelihood of a successful HO. The target eNB configures the required resources according to the received E-RAB QoS information and reserves a C-RNTI and optionally a RACH preamble. The AS-configuration to be used in the target cell can either be specified independently (i.e., as an "establishment") or as a delta compared to the AS-configuration used in the source cell (i.e., as a "reconfiguration"). Upon receipt of the context data, the target eNB stores the context data (e.g., UE RAN context) and reserves certain identifiers (e.g., C-RNTI). Then the target eNB may send context confirmation back to the source RN, where the context confirmation may include the new C-RNTI and other information, as described in more detail below.

With reference to operation 6, the target eNB prepares the handover L1/L2 signaling and sends the handover request acknowledgement message to the source RN. This message includes a transparent container to be sent to the UE as an RRC message for performing the handover. The container includes a new C-RNTI and target eNB security algorithm identifiers for the selected security algorithms, and may include a dedicated RACH preamble and other parameters, e.g., access parameters, SIBs, etc. The message may also include RNL/TNL information for the forwarding tunnels, if necessary.

The handover preparation phase is completed upon the reception of the handover request acknowledgement message in the source RN. The message includes at least radio interface related information (e.g., an HO command for the UE), successfully established E-RAB(s) and failed established E-RAB(s). If the handover resource allocation is not successful (because, e.g., no resources are available on the target side), the target eNB responds with the handover preparation failure message instead of the handover request acknowledgement message.

Upon receiving context confirmation, the source RN sends downlink (DL) allocation information to the UE. Also, the source RN may send a handover command to the UE. The handover command may include a new C-RNTI and other information.

As previously described with reference to operation 6, the target eNB generates an RRC message to perform the handover. With reference to operation 7, the RRC connection reconfiguration message, which includes mobility control information, is sent to the UE by the source RN. The source RN performs the necessary integrity protection and ciphering of the message. The UE receives the RRC connection reconfiguration message along with necessary parameters (e.g., new C-RNTI, target eNB security algorithm identifiers, optionally dedicated RACH preamble, target eNB SIBs, etc.). Further, the UE is commanded by the source RN to execute the handover. The UE does not need to delay the handover execution for delivering HARQ/ARQ responses to the source RN.

Thereafter, the UE may perform procedures to detach from the old cell (i.e., the source RN) and synchronize with the new cell (i.e., the target eNB). Also, the source RN sends status information to the target eNB to indicate the most recent information regarding transmission and/or reception of packets (user data). The sequence number (SN) status transfer message is used to manage forwarding of user plane data. With reference to operation 8, the source RN sends the SN status transfer message to the target eNB to convey the uplink PDCP SN receiver status and the downlink PDCP SN transmitter status of E-RABs for which PDCP status preservation applies (e.g., for RLC AM). The uplink PDCP SN receiver status includes at least the PDCP SN of the first missing UL SDU and may include a bit map of the receive status of the out-of-sequence UL SDUs (if any) that the UE needs to retransmit in the target cell. The downlink PDCP SN transmitter status indicates the next PDCP SN that the target eNB shall assign to new SDUs that do not have a PDCP SN yet. The source RN may omit sending this message if none of the E-RABs of the UE is to be treated with PDCP status preservation.

With reference to operation 8.1, according to one embodiment, the target eNB sends a "Start Forward Request" message to the S/P-GW of UE upon receipt of the SN Status Transfer message (e.g., after the target eNB receives the SN Status Transfer message and before the synchronization of operation 9).

In addition, following operation 8, the source RN may deliver buffered packets to the target eNB. That is, the source RN delivers buffered user data to the target eNB. Upon receipt, the target eNB stores (buffers) the packets received from the source RN.

The above-noted buffered packets refer to the "late packets" that were described earlier—i.e., the relatively small number of packets that were addressed to the UE and that arrived at the S/P-GW after the handover decision was made (operation 3) and/or while the Store&Forward request (operation 3.1) was being processed at the S/P-GW of the UE. Because the number of such packets will be relatively small, it is believed that the forwarding of such packets will be completed before operation 14 ("switch DL path") is reached.

With reference to operation 8.2, after receiving the "Start Forward Request" message, the S/P-GW of the UE begins forwarding buffered packets (i.e., packets that were buffered at the S/P-GW of the UE in response to the "Store Request" message of Operation 3.1) to the target eNB. The S/P-GW of the UE may continue forwarding such packets until its buffer is empty and while the queued packets and its connection are valid.

In addition, the S/P-GW of the UE may also begin forwarding to the target eNB incoming (as well as forthcoming) packets addressed to the UE.

According to one embodiment, the above-described forwarding of operation 8.2 begins after operation 8.1 (i.e., after the "Start Forward Request" message is received) and before the synchronization of operation 9. Alternatively, operation 8.2 may be performed after any of the operations 9-16. As such, the forwarding of operation 8.2 may begin at various points in time after operation 8 but before operation 17.

It may be beneficial to begin forwarding packets sooner rather than later if, for example, the UE will likely remain in the cell corresponding to the target eNB. Conversely, if it is likely that the UE will move yet again, then it may be beneficial to begin forwarding packets later rather than sooner.

Thereafter, the UE can begin to access the target eNB upon re-establishing the radio environment by sending, to the target eNB, parameters including timing synchronization. With reference to operation 9, after receiving the RRC connection reconfiguration message including the mobility control information, the UE performs a synchronization to the target eNB. The UE accesses the target cell via RACH, following a contention-free procedure if a dedicated RACH preamble was indicated in the mobility control information, or following a contention-based procedure if no dedicated preamble was indicated. The UE derives target-eNB specific keys and configures the selected security algorithms to be used in the target cell.

The target eNB then sends information to the UE related to uplink (UL) allocation of resources and timing adjustment. With reference to operation 10, the target eNB sends this information to the UE.

In response, the UE sends a confirmation regarding handover (e.g., a handover confirmation message) to the target eNB. Additionally, the UE may send information regarding the status of transmitted and received packets (e.g., a status report) to the target eNB. With reference to operation 11, when the UE has successfully accessed the target cell, the UE sends the RRC connection reconfiguration complete message (C-RNTI) to confirm the handover, along with an uplink Buffer Status Report, whenever possible, to the target eNB to indicate that the handover procedure is completed for the UE. The target eNB verifies the C-RNTI sent in the RRC connection reconfiguration complete message. The target eNB can now begin sending data to the UE.

With reference to operation 12, the target eNB sends a path switch message to the MME to inform the MME that the UE has changed cells (i.e., from the source RN to the target eNB).

Upon being informed of the updated UE location (i.e., of the UE handover completion), the core network (MME/UPE) performs path switching such that packets that would have been sent to the source RN before handover are now to be sent to the target eNB after handover. As a result, the target eNB transfers the packets received from the core network to the UE such that the user continues to receive the desired user data or packets in a seamless manner during and after handover.

With reference to operation 13, the MME sends an update user plane request message to the serving gateway. With reference to operation 14, the serving gateway switches the downlink data path to the target eNB. The serving gateway sends one or more "end marker" packets on the former path (i.e., the path to the source RN) and then can release any U-plane/TNL resources towards the source RN. With reference to operation 15, the serving Gateway sends an update user plane response message to the MME. With reference to operation 16, the MME confirms the path switch message with a path switch acknowledgement message.

With reference to operation 17, the target eNB sends a UE context release message to the source RN. In doing so, the target eNB informs the source RN of the success of the handover and triggers the release of resources by the source RN. The target eNB sends this message after the path switch acknowledgement message is received from the MME.

With reference to operation 18, upon receipt of the UE context release message, the source RN can release radio and C-plane related resources associated with the UE. Ongoing data forwarding may continue. For example, data forwarded from the S/P-GW of the UE to the target eNB is wirelessly transmitted from the target eNB to the UE.

Definition of certain messages (i.e., the "Store&Forward" message of operation 3.1 and the "Start Forward Request" message of operation 8.1) will now be described in more detail. Regarding both the "Store&Forward" and the "Start Forward Request" messages, it is observed that the source RN and the target eNB (or target RN) belong to EUTRAN. For communications between the source RN and the target eNB, the S1-AP (Application Protocol) is defined. The S1-AP protocol is based on the GTP-U (GPRS Tunneling Protocol-User plane) protocol between E-UTRAN and the serving gateway (S-GW). Between the S-GW and the PDN-GW (P-GW), the S5 protocol is used. The S5 protocol is also based on either the GTP protocol or the IETF (Internet Engineering Task Force). Because the "Store&Forward" message of operation 3.1 (which is sent from the source RN to the S-GW of the UE) and the "Start Forward Request" message of operation 8.1 (which is sent from the target eNB to the S-GW of the UE) are sent from the eNB "side" to the network "side," the S1-AP between "eNB" side (i.e., RN or DeNB regardless of source or target) and network side, the S1-AP protocol can be used in defining these messages.

Figure 10:
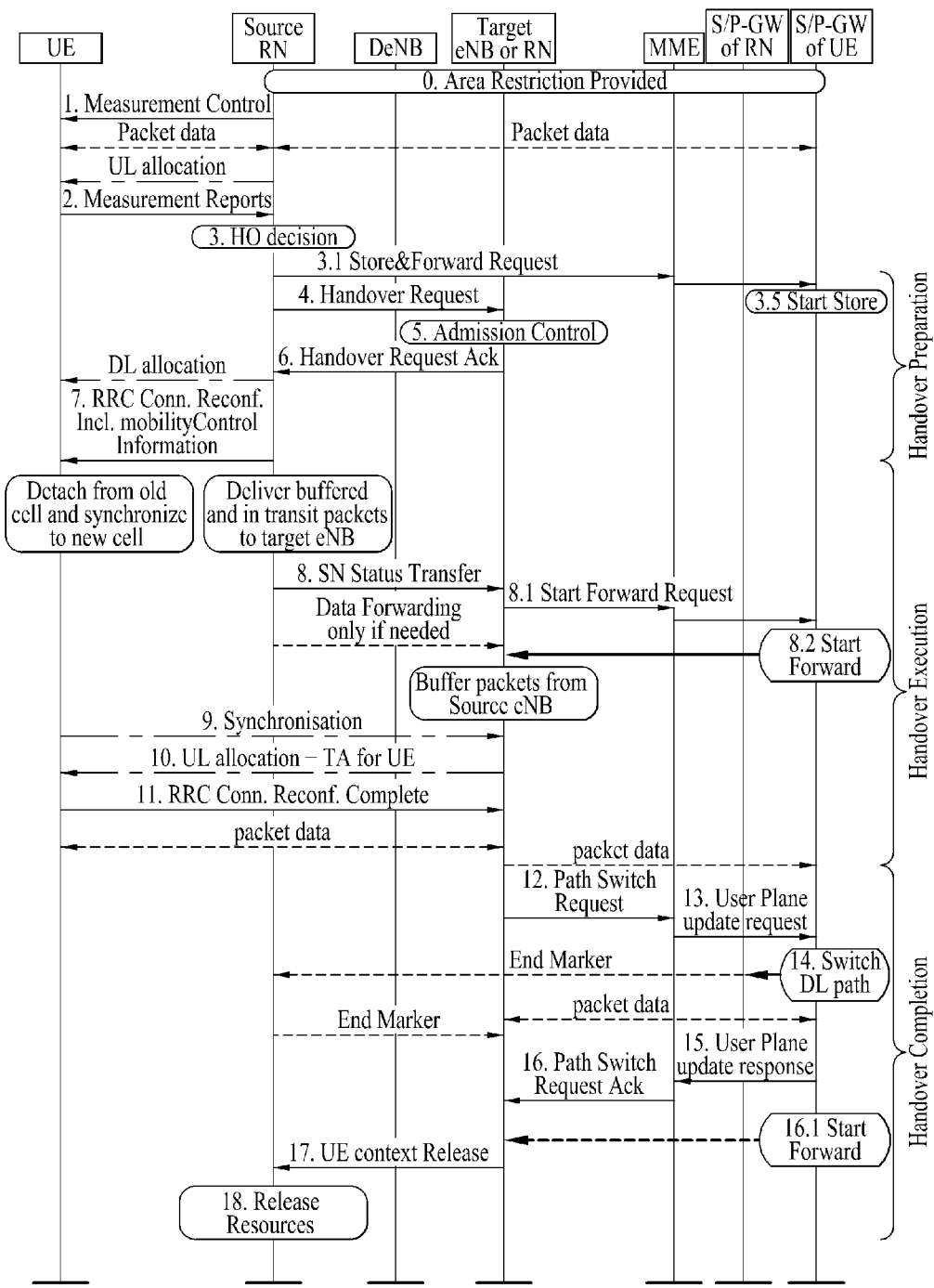
FIG. 10 depicts a flow diagram of a handover procedure according to another embodiment.

According to one embodiment, with reference to FIG. 10, the "Store&Forward" message of operation 3.1 is first sent from the source RN to the MME (using the S1-AP protocol) and then from the MME to the S-GW of the UE (using the S5 protocol). In addition (or alternatively), the "Start Forward Request" message of operation 8.1 is first sent from the target eNB to the MME (using the S1-AP protocol) and then from the MME to the S-GW of the UE (using the S5 protocol).

According to one embodiment, the "Store&Forward" message and/or the "Start Forward Request" message are implemented by adding a new message type. For example, a new message type that is named "Start Forward Request" may be defined, this message type having "MME" as the destination. Such a message type may be defined as an independent (new) message. Alternatively, this message type may also be merged into an existing message type, using a new additional field or an empty (reserved) field.

Once the MME receives the "Store&Forward" message (or "Start Forward Request" message) as defined above, it tailors the message (as needed) and then forwards the message to the S-GW of the UE, as shown in FIG. 10. Here, tailoring may be needed if the message is embedded in another message of an existing message type—e.g., if the message is embedded into another message as a field of that message. In such a situation, the embedded message (i.e., the mother or original message) has a heading of MME. As such, upon receiving the embedded message, the MME extracts the embedded field for transmission to the S-GW of the UE.

With reference back to FIG. 9, according to another embodiment, the "Store&Forward" message of operation 3.1 is sent from the source RN directly to the S-GW of the UE (using the S1-AP protocol). In addition (or alternatively), the "Start Forward Request" message of operation 8.1 is sent from the target eNB directly to the S-GW of the UE (using the S1-AP protocol).

As described earlier with reference to FIG. 10, the "Store&Forward" message and/or the "Start Forward Request" message may be implemented by adding a new message type. For example, a new message type that is named "Start Forward Request" may be defined, this message type having "S-GW of the UE" as the destination.

According to embodiments described earlier, the S/P-GW of the UE is commanded to store packets addressed to the UE and, later, commanded to forward the stored packets to the target eNB. According to another embodiment, the S/P-GW of the RN (rather than the S/P-GW of the UE) is commanded to perform such functions. That is, the S-P-GW of the RN stores the packets and then sends the stored packets to the target eNB upon receipt of the start forward request message. As such, the "Store&Forward" message of operation 3.1 and the "Start Forward Request" message of operation 8.1 (see, e.g., FIG. 9) are directed to the S/P-GW of the RN.

According to embodiments of the present invention, the consumption of relay UL resources is reduced. For example, the allocation of radio resources (in the relay UL) for the forwarding of "late packets" stored at the source RN is reduced. As such, the resources that otherwise would have been allocated for this purpose can be used for other purposes, thereby improving delays when traffic load may be high. In addition, according to embodiments of the present invention, delay in the delivery of packets to the UE is also reduced. For example, "late packets" are not sent back through the "forward tunnel." The RN only has to send a "Store&Forward Request" message to S/P-GW of RN. It is simpler to complete.

Figure 11:
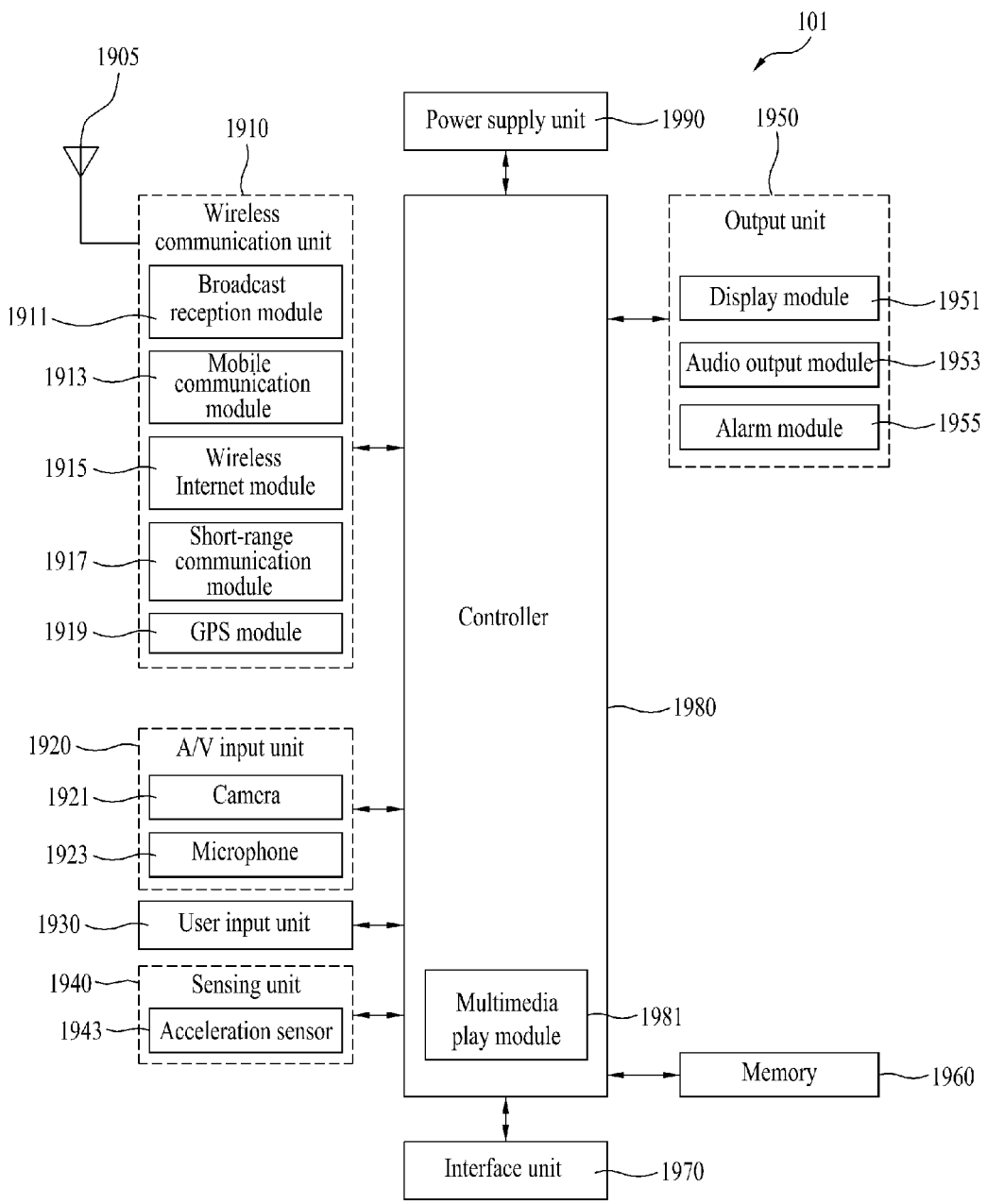
FIG. 11 is a block diagram showing in more detail various components which may be implemented in a UE according to various embodiment of the present invention.

FIG. 11 is a block diagram showing in more detail various components which may be implemented in UE 101 according to various embodiment of the present invention. The UE may also be implemented as a mobile station, a terminal, and the like. It is understood that greater or fewer components than those shown may be implemented.

Referring to FIG. 11, the UE 101 may include a wireless communication unit 1910, an audio/video (A/V) input unit 1920, a user input unit 1930, a sensing unit 1940, an output unit 1950, a memory 1960, an interface unit 1970, a controller 1980, and a power supply unit 1990. Two or more of the wireless communication unit 1910, the A/V input unit 1920, the user input unit 1930, the sensing unit 1940, the output unit 1950, the memory 1960, the interface unit 1970, the controller 1980, and the power supply unit 1990 may be incorporated into a single unit, or some of the wireless communication unit 1910, the A/V input unit 1920, the user input unit 1930, the sensing unit 1940, the output unit 1950, the memory 1960, the interface unit 1970, the controller 1980, and the power supply unit 1990 may be divided into two or more smaller units.

The wireless communication unit 1910 may include a broadcast reception module 1911, a mobile communication module 1913, a wireless Internet module 1915, a short-range communication module 1917, and a GPS module 1919.

The broadcast reception module 1911 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to UE 101 through a mobile communication network. In this case, the broadcast-related information may be received by the mobile communication module 1913, rather than by the broadcast reception module 1911. The broadcast-related information may come in various forms, for example, electronic program guide (EPG) of digital multimedia broadcasting (DMB) or electronic service guide (ESG) of digital video broadcast-handheld (DVB-H).

Broadcast reception module 1911 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 1911 may be configured to be suitable for nearly all types of broadcasting systems other than those set forth herein.

The broadcast signal and/or the broadcast-related information received by the broadcast reception module 1911 may be stored in memory 1960.

The mobile communication module 1913 transmits wireless signals to or receives wireless signals from at least one or more of a base station, an external station, and a server through a mobile communication network. The wireless signals may include various types of data according to whether the UE 101 transmits/receives voice call signals, video call signals, or text/multimedia messages.

The wireless Internet module 1915 may be a module for wirelessly accessing the Internet. The wireless Internet module 1915 may be embedded in the UE 101 or may be installed in an external device.

The short-range communication module 1917 may be a module for short-range communication. The short-range communication module 1917 may use various short-range communication techniques such as Bluetooth®, radio frequency identification (RFID), infrared data association (IrDA), ultra wideband (UWB), and ZigBee®.

The GPS module 1919 may receive position information from one or more satellites (e.g., GPS satellites).

The A/V input unit 1920 may be used to receive audio signals or video signals. The A/V input unit 1920 may include one or more cameras 1921 and a microphone 1923. The camera 1921 processes various image frames such as still images or moving images captured by an image sensor during a video call mode or an image capturing mode. The image frames processed by the camera 1921 may be displayed by a display module 1951.

The image frames processed by the camera 1921 may be stored in the memory 1960 or may be transmitted outside the UE 101 through the wireless communication unit 1910. The UE 101 may include more than two cameras.

The microphone 1923 receives external sound signals during a call mode, a recording mode, or a voice recognition mode with the use of a microphone and converts the sound signals into electrical sound data. In the call mode, the mobile communication module 1913 may convert the electrical sound data into data that can be readily transmitted to a mobile communication base station and then output the data obtained by the conversion. The microphone 1923 may use various noise removal algorithms to remove noise that may be generated during the reception of external sound signals.

The user input unit 1930 generates key input data based on user input for controlling the operation of the UE 101. The user input unit 1930 may be implemented as a keypad, a dome switch, a touch pad (either static pressure or constant electricity), a jog wheel, or a jog switch. In particular, if the user input unit 1930 is implemented as a touch pad and forms a mutual layer structure along with the display module 1951, the user input unit 1930 and the display module 1951 may be collectively referred to as a touch screen.

The sensing unit 1940 determines a current state of the UE 101 such as whether the UE 101 is opened or closed, the position of the UE 101 and whether the UE 101 is placed in contact with a user. In addition, the sensing unit 1940 generates a sensing signal for controlling the operation of the UE 101.

For example, when the UE 101 is a slider-type mobile phone, the sensing unit 1940 may determine whether the UE 101 is opened or closed. In addition, the sensing unit 1940 may determine whether the UE 101 is powered by the power supply unit 1990 and whether the interface unit 1970 is connected to an external device.

The sensing unit 1940 may include an acceleration sensor 1943. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 1943 representing different axial directions may be installed in the UE 101. Alternatively, only one acceleration sensor 1943 representing a Z axis may be installed in the UE 101.

The output unit 1950 may output audio signals, video signals, and alarm signals. The output unit 1950 may include the display module 1951, an audio output module 1953, and an alarm module 1955.

The display module 1951 may display various information processed by the UE 101. For example, if the UE 101 is in a call mode, the display module 1951 may display a user interface (UI) or a graphical user interface (GUI) for making or receiving a call. If the UE 101 is in a video call mode or an image capturing mode, the display module 1951 may display a UI or a GUI for capturing or receiving images.

If the display module 1951 and the user input unit 1930 form a mutual layer structure and are thus implemented as a touch screen, the display module 1951 may be used not only as an output device but also as an input device. If the display module 1951 is implemented as a touch screen, the display module 1951 may also include a touch screen panel and a touch screen panel controller.

The touch screen panel is a transparent panel attached onto the exterior of the UE 101 and may be connected to an internal bus of the UE 101. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 1980. The control unit 1980 then determines whether a touch input has been generated and which part of the touch screen panel has been touched based on the processed signals transmitted by the touch screen panel controller.

As described above, if the display module 1951 and the user input unit 1930 form a mutual layer structure and are thus implemented as a touch screen, the display module 1951 may be used not only as an output device but also as an input device. The display module 1951 may include at least one of a liquid crystal display (LCD), a thin film transistor (TFT)-LCD, an organic light-emitting diode (OLED), a flexible display, and a three-dimensional (3D) display.

The UE 101 may include two or more display modules 1951. For example, the UE 101 may include an external display module and an internal display module.

The audio output module 1953 may output audio data received by the wireless communication unit 1910 during a call reception mode, a call mode, a recording mode, a voice recognition mode, or a broadcast reception mode or may output audio data present in the memory 1960. In addition, the audio output module 1953 may output various sound signals associated with the functions of the UE 101 such as receiving a call or a message. The audio output module 1953 may include a speaker and a buzzer.

The alarm module 1955 may output an alarm signal indicating the occurrence of an event in the UE 101. Examples of the event include receiving a call signal, receiving a message, and receiving a key signal. Examples of the alarm signal output by the alarm module 1955 include an audio signal, a video signal, and a vibration signal.

The alarm module 1955 may output a vibration signal upon receiving a call signal or a message. In addition, the alarm module 1955 may receive a key signal and may output a vibration signal as feedback to the key signal.

Once a vibration signal is output by the alarm module 1955, the user may recognize that an event has occurred. A signal for notifying the user of the occurrence of an event may be output by the display module 1951 or the audio output module 1953.

The memory 1960 may store various programs necessary for the operation of the controller 1980. In addition, the memory 1960 may temporarily store various data such as a phonebook, messages, still images, or moving images.

The memory 1960 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The UE 101 may operate a web storage, which performs the functions of the memory 1960 on the Internet.

The interface unit 1970 may interface with an external device that can be connected to the UE 101. The interface unit 1970 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 1970 may receive data from an external device or may be powered by an external device. The interface unit 1970 may transmit data provided by an external device to other components in the UE 101 or may transmit data provided by other components in the UE 101 to an external device.

The controller 1980 may control the general operation of the UE 101. For example, the controller 1980 may perform various control operations regarding making/receiving a voice call, transmitting/receiving data, or making/receiving a video call.

The controller 1980 may include a multimedia play module 1981, which plays multimedia data. The multimedia play module 1981 may be implemented as a hardware device and may be installed in the controller 1980. Alternatively, the multimedia play module 1981 may be implemented as a software program.

The power supply unit 1990 is supplied with power by an external power source or an internal power source and supplies power to other components in the UE 101.

In alternative implementations, certain logic operations may be performed in a different order, modified or removed and still implement preferred embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

The foregoing embodiments and advantages are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for performing a handover from a source node to a target node in a wireless communication system, the method performed by a network gateway and comprising:
   receiving, from the source node which determines the handover, a store request message including information to request storing of packet data;

receiving, from the target node, a forward request message including information requesting a transmission of the packet data before a synchronization between a user equipment (UE) and the target node;

transmitting, to the target node, the packet data before the synchronization;

completing the handover to the target node based on the synchronization.

2. The method of claim 1, wherein status information is transmitted from the source node to the target node, and indicates a next downlink packet that the target node transmits to the UE.

3. The method of claim 2, wherein the status information further comprises at least one of a bit map of the receive status of out-of-sequence uplink packets or information indicating a first missing uplink packet.

4. The method of claim 1, wherein the target node comprises a target relay node (RN) or a target evolved NodeB (eNodeB).

5. A method for performing a handover from a source node to a target node in a wireless communication system, the method comprising:

transmitting, by the source node to the network gateway, a store request message including information to request storing of packet data, the source node determining the handover;

transmitting, by the target node to the network gateway, a forward request message including information requesting a transmission of the packet data before a synchronization between a user equipment (UE) and the target node; and receiving, by the target node from the network gateway, the packet data before the synchronization; and completing the handover to the target node based on the synchronization.

6. The method of claim 5, wherein status information is transmitted from the source node to the target node, and indicates next downlink packet that the target node transmits to the UE.

7. The method of claim 5, wherein the status information further comprises information indicating next packet that the target node transmits to the UE.

8. The method of claim 5, wherein the status information further comprises at least one of a bit map of the receive status of out-of-sequence uplink packets or information indicating a first missing uplink packet.

9. The method of claim 5, wherein the target node comprises a target relay node (RN) or a target evolved NodeB (eNodeB).

10. A network gateway to perform a handover from a source node to target node in a wireless communication system, the network gateway comprising:

a communication unit; and a controller which is configured to:

receive, from the source node which determines the handover, a store request message including information to request storing of packet data;

receive, from the target node, a forward request message including information requesting a transmission of the packet data before a synchronization between a user equipment (UE) and the target node; and transmit, to the target node, the packet data before the synchronization;

completing the handover to the target node based on the synchronization.

11. The network gateway of claim 10, wherein status information is transmitted from the source node to the target node, and indicates next packet that the target node transmits to the UE.

12. The network gateway of claim 11, wherein the status information further comprises at least one of a bit map of the receive status of out-of-sequence uplink packets or information indicating a first missing uplink packet.

13. The method of claim 1, wherein the store request message is firstly transmitted from the source node to a MME (Mobility Management Entity) using a S1-AP (Application Protocol) Protocol and then transmitted from the MME to the network gateway using a S5 protocol.

14. The method of claim 1, wherein the forward request message is firstly transmitted from the target node to a MME (Mobility Management Entity) using a S1-AP (Application Protocol) Protocol and then transmitted from the MME to the network gateway using a S5 protocol.

* * * * *